United States Patent [19]

Negre et al.

[11] Patent Number: 5,313,695
[45] Date of Patent: May 24, 1994

[54] PROCESS AND DEVICE FOR BODY ASSEMBLY WITH LATERAL TOOLS THAT CAN BE INTERPOSITIONED

[75] Inventors: Bernard Negre, Paris; Christian de Filippis, Evry, both of France

[73] Assignee: Renault Automation, Boulogne Billancourt, France

[21] Appl. No.: 970,963

[22] Filed: Nov. 3, 1992

Related U.S. Application Data

[63] Continuation of Ser. No. 500,489, Mar. 28, 1990, abandoned.

[30] Foreign Application Priority Data

Mar. 28, 1989 [FR] France .................................. 89 03979

[51] Int. Cl.⁵ .............................................. B23Q 3/00
[52] U.S. Cl. .................................. 29/33 P; 198/345.3; 219/86.24; 901/42
[58] Field of Search ............... 29/33 P; 228/45, 47 A; 901/41, 42; 198/345.3, 345.1; 219/86.24

[56] References Cited

U.S. PATENT DOCUMENTS

| | | | |
|---|---|---|---|
| 4,400,607 | 8/1983 | Wakou et al. | 29/568 |
| 4,404,451 | 9/1983 | Niikawa et al. | 228/47 A |
| 4,600,136 | 7/1986 | Sciaky et al. | 228/47 A |
| 4,606,488 | 8/1986 | Yanagisawa | 228/45 |
| 4,670,961 | 6/1987 | Fontaine et al. | . |
| 4,751,995 | 6/1988 | Naruse et al. | 198/345.3 |
| 4,946,089 | 8/1990 | Baulier et al. | 228/45 |

FOREIGN PATENT DOCUMENTS

| | | | |
|---|---|---|---|
| 32890 | 7/1981 | European Pat. Off. | 29/568 |
| 2619523 | 2/1989 | France . | |
| 79935 | 4/1987 | Japan | 29/568 |
| 774918 | 10/1980 | U.S.S.R. | 29/568 |
| 781016 | 11/1980 | U.S.S.R. | 29/568 |
| 914237 | 3/1982 | U.S.S.R. | 29/568 |

*Primary Examiner*—Daniel W. Howell
*Attorney, Agent, or Firm*—Oblon, Spivak, McClelland, Maier & Neustadt

[57] ABSTRACT

A process and device for interpositioning the tools of a body assembly machine which includes departing from all the intermediate mechanisms for putting these tools in place, from the function of their geometric referencing, so as to impart to the tools themselves the ability to be interpositioned after temporary isolation of a part of them from their positioning mechanism. According to the process, these tools are made to have a lateral orientation.

1 Claim, 5 Drawing Sheets

といった5,313,695

PROCESS AND DEVICE FOR BODY ASSEMBLY WITH LATERAL TOOLS THAT CAN BE INTERPOSITIONED

This application is a continuation of application Ser. No. 07/500,489, filed on Mar. 28, 1990, now abandoned.

BACKGROUND OF THE INVENTION

1. Field of the Invention

This invention relates to production lines for bodies, for example of motor vehicles.

2. Discussion of the Background

The invention relates more particularly to a process and a device for the positioning tools of a body assembly machine, derived from the one described in U.S. Pat. No. 4,946,089. There, two upper tools and a lower tool are supported in a stationary frame. They may be clamped together to form a rigid structure extending in the median longitudinal plane of a vehicle being assembled, as best seen in FIG. 9 of that patent. This assures that the body is perfectly positioned for automated assembly operations.

The present invention has as its object to propose an alternative solution, structured around lateral tools. The prior art does not cite and does not suggest any similar system.

SUMMARY OF THE INVENTION

For this purpose, the invention takes up the principle of interpositioning of the positioning tools of a body assembly machine, as described and claimed in the above patent, but applies it to positioning tools extending in a crosswise plane. It therefore relates to the application of this principle to this positioning tool structure, as well as the elements for handling these tools. It differs from the prior art by the fact that the new tool structure thus obtained extends laterally of the vehicle median longitudinal plane.

In addition to the advantage cited for U.S. Pat. No. 4,946,089, in the present invention, there occurs: an improvement the weight of the machine structure (i.e. there is no oversizing required of the elements to reduce sagging); a gain in rigidity; an increased repeatability over time, an autonomous positioning tool making it possible to accomplish off line: checking of the references, adjustment of the work tools, the production of a small series of vehicles (preseries); and programming and optimizing of the robot paths; a gain in production time (i.e. work in time covered) and in line conversion (i.e. a reduction in stopping time); preservation of the confidentiality surrounding any new automobile product, by the possibility thus offered to study and to produce tools specific to a model, separately from the machine production; and positioning of the sorting of interlocked tools in the machine production with a single positioning tolerance of the welding points. In addition, the present invention makes possible a greater triangulation of the interpositioned tools.

The present invention differs from the configuration systems in conventional lateral frames (or gates) by: its original system of positioning the tools; the independence of the machine structure from the functioning of the various tools with respect to one another, and its ability to easily take into account a certain number of axial references.

BRIEF DESCRIPTION OF THE DRAWINGS

Other features and advantages of the invention will be derived more clearly from the following description of a preferred embodiment, given by way of nonlimiting example, with reference to the accompanying drawings in which.

DESCRIPTION OF THE PREFERRED EMBODIMENT

Figure 1:
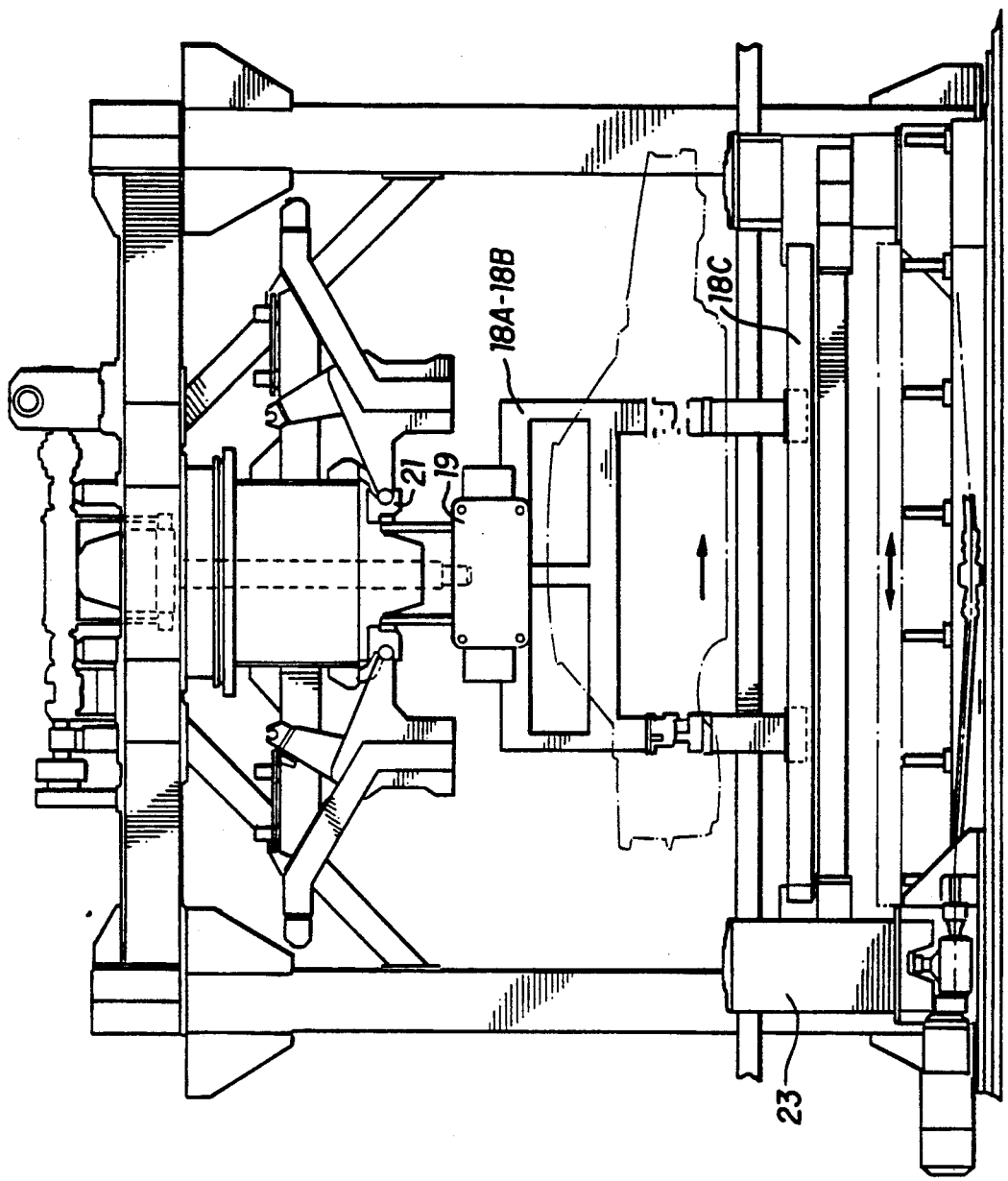
FIG. 1 represents a longitudinal view of the present invention with a tool crib for making it possible to distribute four upper tools (for at least two different vehicles), as well as illustrating the lower plate changing system.
Figure 4:
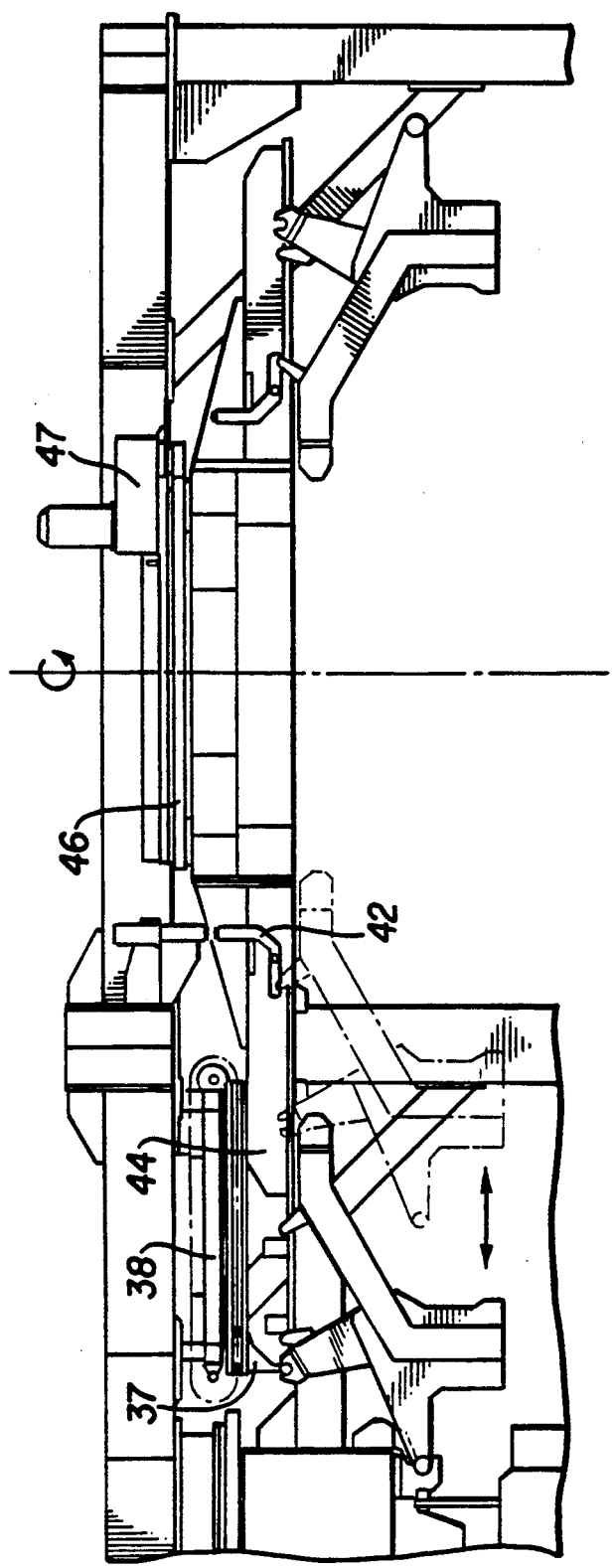
FIG. 4 represents a longitudinal view of the central distributor equipped with a second option of two rotary cribs (one in front and one in back of the machine) making it possible to store a total of ten tools for the production of at least five different vehicles.

The body assembly machine illustrated in FIGS. 1 and 4 is structured a stationary frame 01 and around three different types of positioning tools, these being: one lower tool 18C with two positions, including the working position shown in solid lines, and two lateral upper positioning tools 18A and 18B that can be separated from the structure of the machine in a work position.

Each type of positioning tool is, in addition, served by a tool changing device which makes it possible to configure the geometrizing station as a function of the type of vehicle in place.

This machine is constituted as follows:

A central frame or structure 01 supporting all the mechanisms for handling and distributing the upper positioning tools. Operation of the present invention is as follows: Handling function (i.e. putting the three tools in place):

For the upper part

A set of connecting rods 10 and 12 raise and lower each tool (i.e. "cribbing" position and "work" position). This set of connecting rods is actuated by a motor 07 and a reduction gear 09. The static balance of the tool in question is assured by balance member in the form of a cylinder 11.

Figure 3:
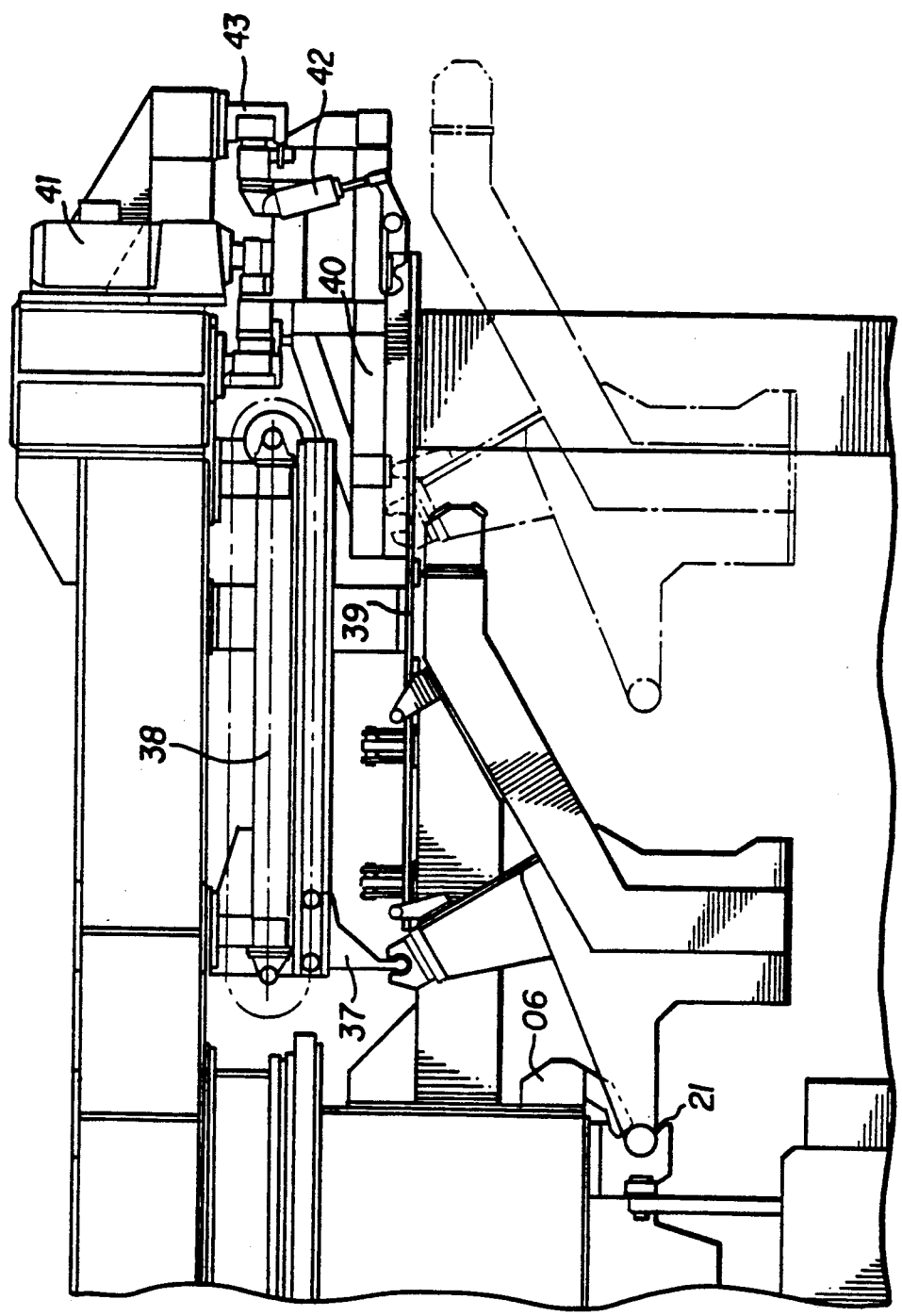
FIG. 3 represents a longitudinal view of the central distributor equipped with a first option of two crosswise cribs (one in front and one in back of the machine), making it possible to store a total of six tools for the production of at least three different vehicles.

As seen in FIG. 1, each of the positioning tools 18A and 18B is pivoted at axis 21. It is held in place in a floating manner by a device 06. FIG. 3 shows the device 06 loosely holding a tool at axis 21 to provide the floating effect.

For lower part

A set of four columns 23 raise and lower lower plate 18C. Its spatial positioning is assured by member 28.

Crib storing function

For the upper part

OPTION 1

A central rotary distributor 02 equipped with a collar 03 is able to store (i.e. distribute) four positioning tools.

OPTION 2 (assuming OPTION 1 has been taken)

either a front crib or a back crib 40 of a translating type (with three positions) make it possible to store one tool (per crib) and to assure the removal or loading of tools from central distributor 02 by a translating mechanism 38 of a tie bar 37, the unit rolling on stationary rails 39. Locking of the tool in this crib is assured by locking member 42 (FIG. 3) and crosswise translation on rails 43 is assured by motorized system 41;

or a front crib and a back crib 44 of the rotary type (with four positions) make it possible to store three tools (per crib) and to assure the removal or changing of tools from central distributor 02 by translating mechanism 38 of tie bar 37. Locking of the tool in this crib is assured by the locking member 42 (FIG. 4). Rotation of the crib around collar 46 is assured by motor 47.

For the lower part

In its descending movement, lower elevator 23 deposits lower tool 18C on roller system 29 and translation mechanism 31 (which is optional) makes it possible to remove lower plate 18C longitudinally and, at the same time, to supply another plate with a lower tool.

Vehicle geometry function

Figure 2A:
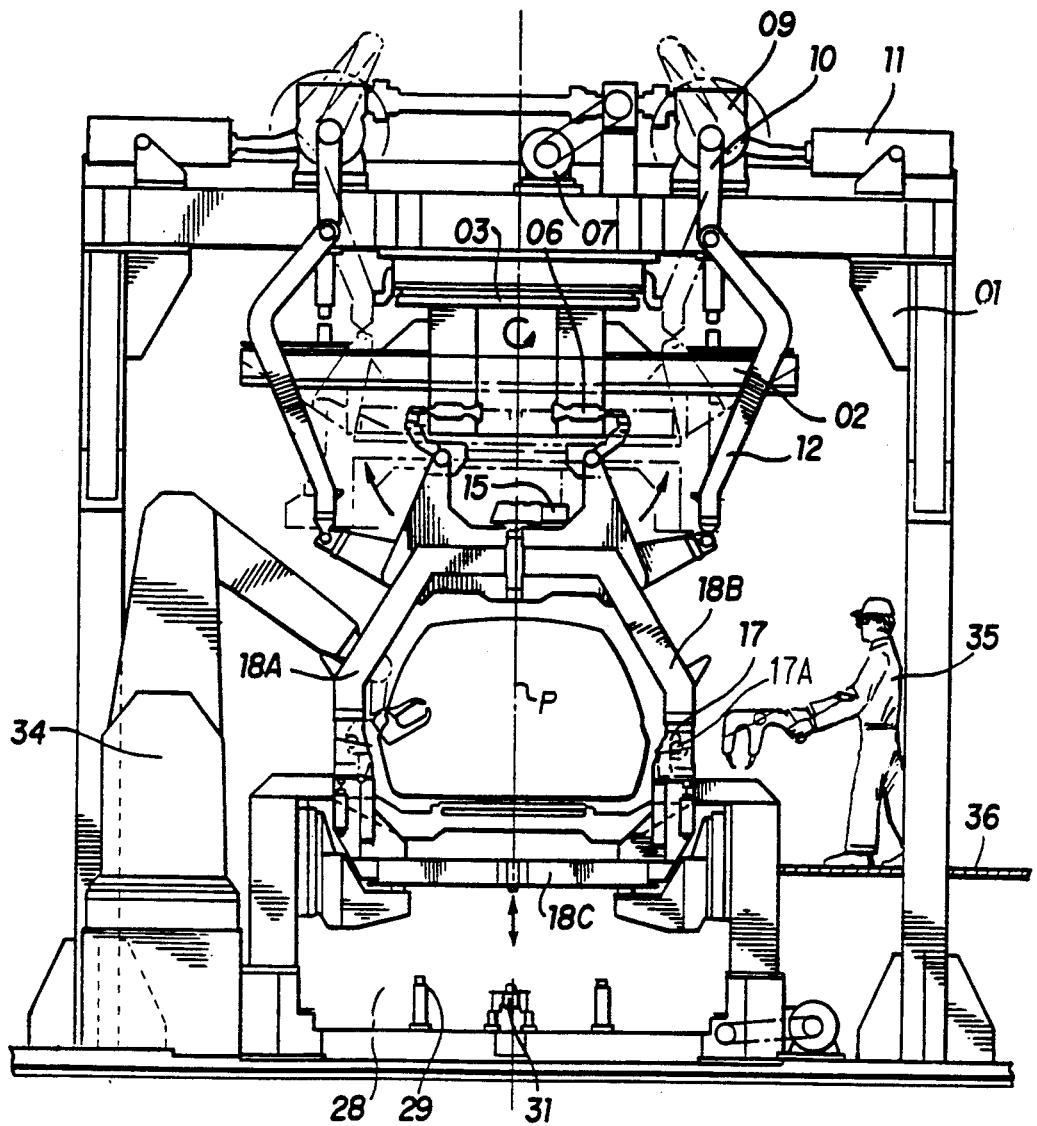
FIGS. 2A and 2B represent crosswise views of the machine (with an additional tool crib) in lowered and raised positions, respectively, making it possible to distribute four upper tools (for at least two different) vehicles), as well as the lower plate changing system.
Figure 2B:
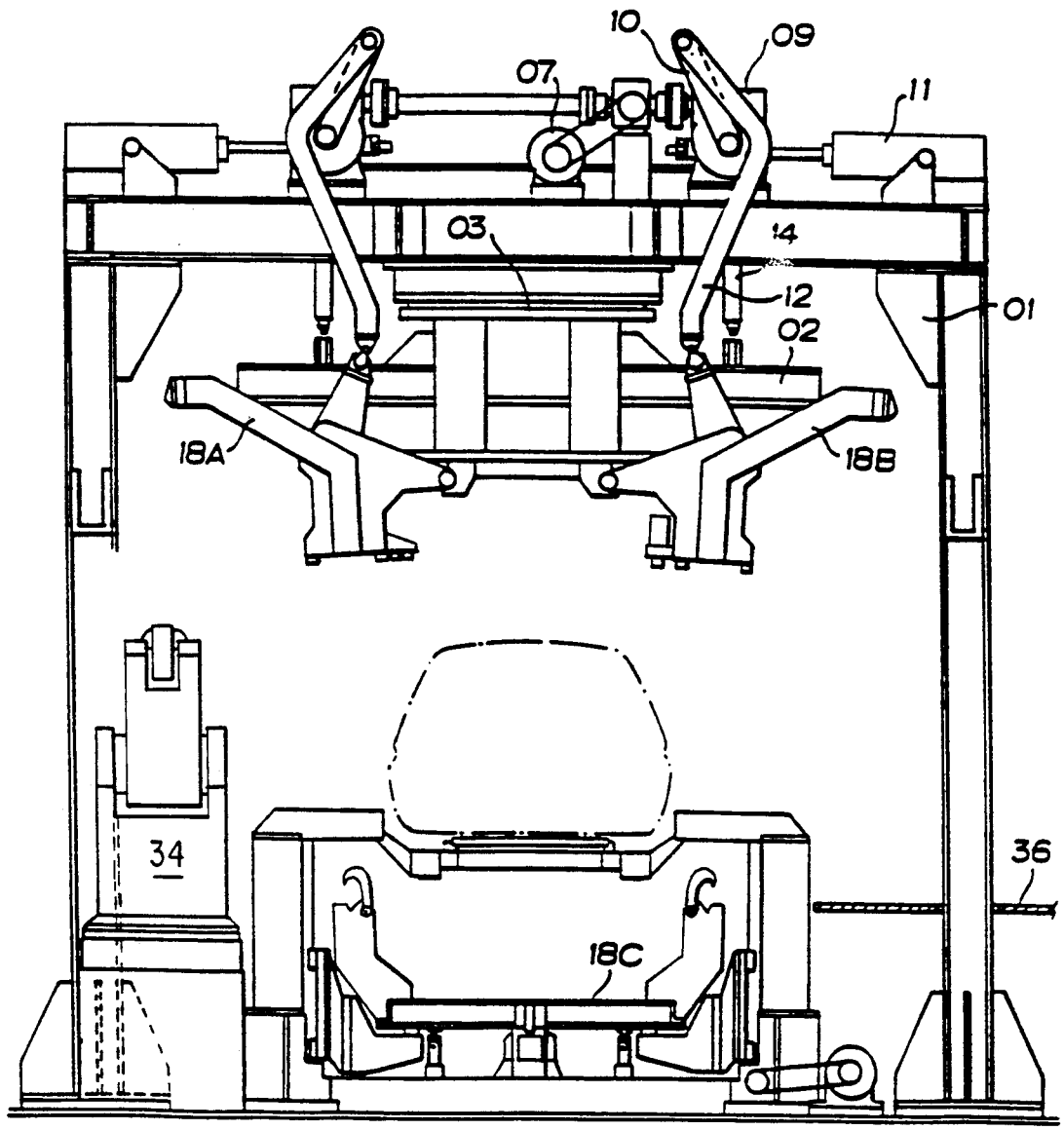

Once the trio of tools is selected, the perfect geometrizing operation of body "A" is achieved with these three tools:

both lateral positioning tools 18A and 18B pivot around the axis of rotation defined by member 21 and are interlocked by members 19 and 15 (the locking represented in FIGS. 1 and 2 is of a "flush fitting" type but can also be of the "rotoid" type).

lower tool 18C will then be positioned with the precision required by the single execution tolerance of the robotized welding points, while approaching the unit formed by lateral tools 18A and 18B make possible:

a very accurate self-centering of a unit formed by lateral tools 18A and 18B on lower tool 18C, locking of unit 18A and 18B with lower tool 18C by locking member 17, i.e., locking member 17 is a latch mounted to tool 18C which hooks onto a pin 17a of a tool 18A or 18B, separation of the unit formed by lateral tools 18A and 18B from member 21 and, consequently, from the entire machine structure 01.

after interlocking of lateral tools 18A and 18B with lower 18C, these three tools form a rigid pyramidal structure, as appears from the Figures, independent of outside structure 01, tightly holding body "A" in its crosswise plane.

Uniting of the parts function

This can be assured in different ways:

Robots 34;

Operators 35 on flooring 36; or

Specific welding tongs (or other connecting means) in the tool.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. A device for interpositioning positioning tools of a body assembly machine, comprising:

a stationary frame in which a vehicle body having a median longitudinal plane can be positioned;

first and second positioning tools detachably supported by the frame and respectively extending laterally on opposite sides of the median longitudinal plane of a vehicle in the frame;

a third positioning tool supported within the frame at a position below a vehicle in the frame;

means for clamping the first and second tools to the third tool to form a rigid structure independent of the frame and surrounding and positioning the vehicle body in the frame.

* * * * *